Patented Nov. 20, 1923.

1,474,433

UNITED STATES PATENT OFFICE.

WALTER A. KUHNERT, OF SAN FRANCISCO, CALIFORNIA.

METHOD OF OBTAINING BORAX.

No Drawing. Application filed December 21, 1922. Serial No. 608,381.

*To all whom it may concern:*

Be it known that I, WALTER A. KUHNERT, a citizen of the United States, residing at San Francisco, in the county of San Francisco and State of California, have invented new and useful Improvements in Methods of Obtaining Borax, of which the following is a specification.

The present invention relates to an improved method of obtaining borax from solutions containing borax, sodium carbonate, sodium sulphate, sodium chloride and potassium chloride as the principal saline concommitants, but also containing in solution small amounts of sodium silicate and sodium aluminate together with the sodium salts of other mineral and organic acids, said solutions being found in the waters of certain natural lakes, or being obtained by re-dissolving the salts remaining after the evaporation of the waters of said lakes, the method being more simple and less expensive than is the case with present methods.

One solution to which I may apply my improved method may be obtained by solar evaporation and concentration of the water of Owens Lake, Inyo County, in the State of California, of which solution the following is the composition:

| | |
|---|---:|
| $Na_2CO_3$ | 10.55 |
| $Na_2B_4O_7$ | 3.76 |
| $Na_2SO_4$ | 2.48 |
| KCl | 5.63 |
| NaCl | 8.96 |
| $Na_2SiO_3$ | .28 |
| $Na_3AlO_3$ | .24 |
| Other sodium salts and water | 68.10 |
| | 100.00 |

I have found that the addition of bicarbonate of soda to a solution such as above described, decomposes a large portion of the sodium aluminate and sodium silicate by reacting with the sodium radical of such portion, thereby forming sodium carbonate and setting free hydrated alumina and silica, which precipitate out of the solution during the treatment. The solubility of the borax component of the solution is, following the above mentioned reaction, greatly depressed; and when this solution with the soluble bicarbonate of sodium added thereto is allowed to stand for several days, about 40% of its borax content will crystallize out of the solution as the decahydrate.

Into a solar concentrated solution of brine of the character defined, wherein originally, of its five principal saline concommitants, there is contained a greater quantity of or amount of sodium carbonate than of borax, I introduce such an amount of bicarbonate of sodium as will be soluble within the solution, this introduction being made when the solution has a temperature of approximately 40° Centigrade, and a portion of the alumina, silica and the borax is thereby rendered insoluble. The introduction of the bicarbonate of sodium may be carried out by any suitable means for effecting actual physical addition thereof to the solution, or by causing the formation of the bicarbonate of sodium within the solution itself, by the partial decomposition of the requisite amount of sodium carbonate contained in the solution, either by the introduction of carbonic acid gas, or any other acid forming gas, or by the introduction of any acid into the solution.

After the introduction of the bicarbonate of sodium into the solution, the precipitated silica and alumina are removed therefrom by filtration or other suitable means, the solution being then allowed to stand for several days when about 40% of its borax content will crystallize out of the solution. The precipitated borax is then removed from the mother liquor by filtration or any other means well known in the art, the mother liquor retaining the other salts and containing more sodium carbonate than borax. After this initial removal of borax, the mother liquor is again treated as was the original solution, by solar evaporation to again concentrate the sodium silicate, sodium aluminate and borax content of said mother liquor. The bicarbonate of sodium is then again introduced and a further quantity of borax removed, as previously described. This operation is repeated until the total recovery of borax is obtained.

I find from actual experience that such a high borax concentration as I herein specify in connection with solar concentrated Owens Lake water, is only possible with a brine which initially contains among its five principal saline concommitants, a greater quantity or amount of sodium carbonate than borax.

This is for the reason that the original lake water does not contain sufficient sodium silicate and sodium aluminate to effect such a high concentration of borax, without loss, at atmospheric temperatures, as is required in the application of my process. But I find that by utilizing the solvent action of the sodium carbonate contained in the original brine upon the clay of the solar evaporating basins, in which the final concentration is effected, that the aforesaid deficiency in sodium aluminate and sodium silicate is continuously overcome and that the required degree of solubility of borax is produced and is due to their presence in the solution.

Since my process contemplates the total recovery of the borax contained in any specific brine that has been empounded and prepared for treatment, exclusively by means of solar evaporation as the concentrating media, it is quite obvious that the mother liquor after the first borax crop must be again subjected in clay evaporating basins to the concentrating action of solar heat in order that the desired degree of sodium silicate, sodium aluminate and borax concentration may be again attained, when the treatment with bicarbonate of sodium herein described is repeated.

I claim:

1. The process of obtaining borax from certain solutions containing borax, sodium carbonate, sodium sulphate, sodium chloride, potassium chloride, sodium aluminate, sodium silicate and other salts, the sodium carbonate content of the solution being greater than that of the borax, which process consists in introducing into said solution sufficient soluble bicarbonate of sodium to render a portion of the borax insoluble within the solution and removing the insoluble borax by filtration or other means from the mother liquor so that said mother liquor will retain the other salts and will contain more sodium carbonate than borax.

2. The process of obtaining borax from certain solutions containing borax, sodium carbonate, sodium sulphate, sodium chloride, potassium chloride, sodium aluminate, sodium silicate and other salts, the sodium carbonate content of the solution being greater than that of the borax, which process consists in introducing into said solution sufficient soluble bicarbonate of sodium to render a portion of the borax insoluble within the solution, removing the insoluble borax by filtration or other means from the mother liquor so that said mother liquor will retain the other salts and will contain more sodium carbonate than borax, then concentrating the borax content in said mother liquor by solar heat, then again adding bicarbonate of sodium to the mother liquor as before, and then removing a further quantity of borax by filtration or other means.

3. The process of obtaining borax from certain solutions containing borax, sodium carbonate, sodium sulphate, sodium chloride, potassium chloride, sodium aluminate, sodium silicate and other salts, the sodium carbonate content of the solution being greater than that of the borax, which process consists in introducing into said solution sufficient soluble bicarbonate of sodium to render a portion of the borax insoluble within the solution and removing the insoluble borax by filtration or other means from the mother liquor so that said mother liquor will contain more sodium carbonate than borax.

WALTER A. KUHNERT.